(12) United States Patent
Shinomiya

(10) Patent No.: US 9,756,199 B2
(45) Date of Patent: Sep. 5, 2017

(54) ADDING OR UPDATING AT LEAST ONE SERVICE OF A GENERIC ATTRIBUTE PROFILE

(71) Applicant: Kiyohiko Shinomiya, Tokyo (JP)

(72) Inventor: Kiyohiko Shinomiya, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/944,787

(22) Filed: Nov. 18, 2015

(65) Prior Publication Data

US 2016/0150105 A1 May 26, 2016

(30) Foreign Application Priority Data

Nov. 20, 2014 (JP) ................................. 2014-235639

(51) Int. Cl.
*H04W 4/00* (2009.01)
*H04N 1/00* (2006.01)

(52) U.S. Cl.
CPC ....... *H04N 1/00307* (2013.01); *H04N 1/0032* (2013.01); *H04W 4/008* (2013.01); *H04N 2201/0094* (2013.01)

(58) Field of Classification Search
CPC .. H04N 1/00307; H04N 1/0032; H04W 4/008
USPC ....................................................... 358/1.15
See application file for complete search history.

(56) References Cited

U.S. PATENT DOCUMENTS

| | | | | |
|---|---|---|---|---|
| 2003/0216146 A1* | 11/2003 | Otsuka | ............. | H04M 1/72502 455/462 |
| 2010/0141987 A1* | 6/2010 | Miyamoto | ......... | H04N 1/00222 358/1.15 |
| 2014/0173588 A1* | 6/2014 | Ko | ............................ | G06F 8/68 717/173 |
| 2015/0292985 A1* | 10/2015 | Yenni | ................. | G05B 23/0221 702/182 |

FOREIGN PATENT DOCUMENTS

JP     2013-126003     6/2013

* cited by examiner

*Primary Examiner* — Eric A Rust
(74) *Attorney, Agent, or Firm* — Harness, Dickey & Pierce P.L.C.

(57) ABSTRACT

A data communication device includes a communication unit that performs a communication in accordance with a standard of a short-range wireless communication; a storage unit that stores therein, among profiles that conform to the standard of the short-range wireless communication and that define a method of using a protocol, a first profile in which multiple services are settable and in which identification information is related to the services; and an arbitrating unit that, when an application is to be installed, adds or updates a service used by the application with regard to the first profile in accordance with the identification information that is related to the service.

17 Claims, 16 Drawing Sheets

FIG.8

| No. | ITEM NAME | EXPLANATIONS | UUID | TYPE | PROPER-TIES | PERMIS-SIONS | Value (FIXED VALUE) | REMARKS |
|---|---|---|---|---|---|---|---|---|
| 1 | FORMAT NAME | FORMAT NAME | 0xA001 | string | 2 | 1 | xx1 | |
| 2 | VERSION | VERSION OF FORMAT | 0xA002 | uint 16 | 2 | 1 | 001 | 000 FIXED (3 BYTES FIXED) |
| 3 | IP ADDRESS (IPv4) (MFP SIDE) | IP ADDRESS WITH WHICH APP CONNECTS TO MFP | 0xA003 | string | 2 | 1 | C0.A8.0.1 | 0 TO FF.0 TO FF.0 TO FF.0 TO FF MAXIMUM LENGTH 11 BYTES EACH OCTET IN HEXADECIMAL EXAMPLE: 192.168.0.1=>C0.A8.0.1 . IS ONE-BYTE PERIOD |
| 4 | Wi-Fi Direct | VALUE AS TO WHETHER SMART DEVICE ALLOWS CONNECTION TO Cheetah Wi-Fi Direct | 0xB001 | uint 16 | 2 | 1 | 1 | 1 BYTE FIXED 0: INVALID 1: VALID |
| 5 | SSID | SSID WITH WHICH SMART DEVICE CONNECTS TO Wi-Fi NETWORK | 0xB002 | string | 2 | 1 | cheetah | MAXIMUM LENGTH 32 BYTES |
| 6 | PASSWORD | PASSWORD WITH WHICH SMART DEVICE CONNECTS TO Wi-Fi NETWORK | 0xB003 | string | 2 | 1 | xxxxxxx | MAXIMUM LENGTH 63 BYTES |

FIG.9

```xml
<?xml version="1.0" encoding="utf-8"?>
<!--
 * MFP Data *
-->
<leserver>
  <service uuid="180a" primary="1">
    <characteristic uuid="2A29" properties="02" permissions="01">
      <value type="string">XXXX</value>
    </characteristic>
    <characteristic uuid="2A24" properties="02" permissions="01">
      <value type="string">xx1</value>
    </characteristic>
    <characteristic uuid="2A25" properties="02" permissions="01">
      <value type="string">1234567890</value>
    </characteristic>
  </service>

<service uuid="A000" primary="1">
    <!-- format -->
    <characteristic uuid="A001" properties="2" permissions="1">
      <value type="string">xx1</value>
    </characteristic>
    <!-- Ver -->
    <characteristic uuid="A002" properties="2" permissions="1">
      <value type="uint16">001</value>
    </characteristic>
    <!-- IP addr(MFP) -->
    <characteristic uuid="A003" properties="2" permissions="1">
      <value type="string">C0.A8.0.1</value>
    </characteristic>
    <!-- Wi-Fi Direct(ON/OFF) -->
    <characteristic uuid="B001" properties="2" permissions="1">
      <value type="uint16">1</value>
    </characteristic>
    <!-- SSID -->
    <characteristic uuid="B002" properties="2" permissions="1">
      <value type="string">cheetah</value>
    </characteristic>
    <!-- PWD -->
    <characteristic uuid="B003" properties="2" permissions="1">
      <value type="string">xxxxxxx</value>
    </characteristic>
        :
        :
  </service>
</leserver>
```

901

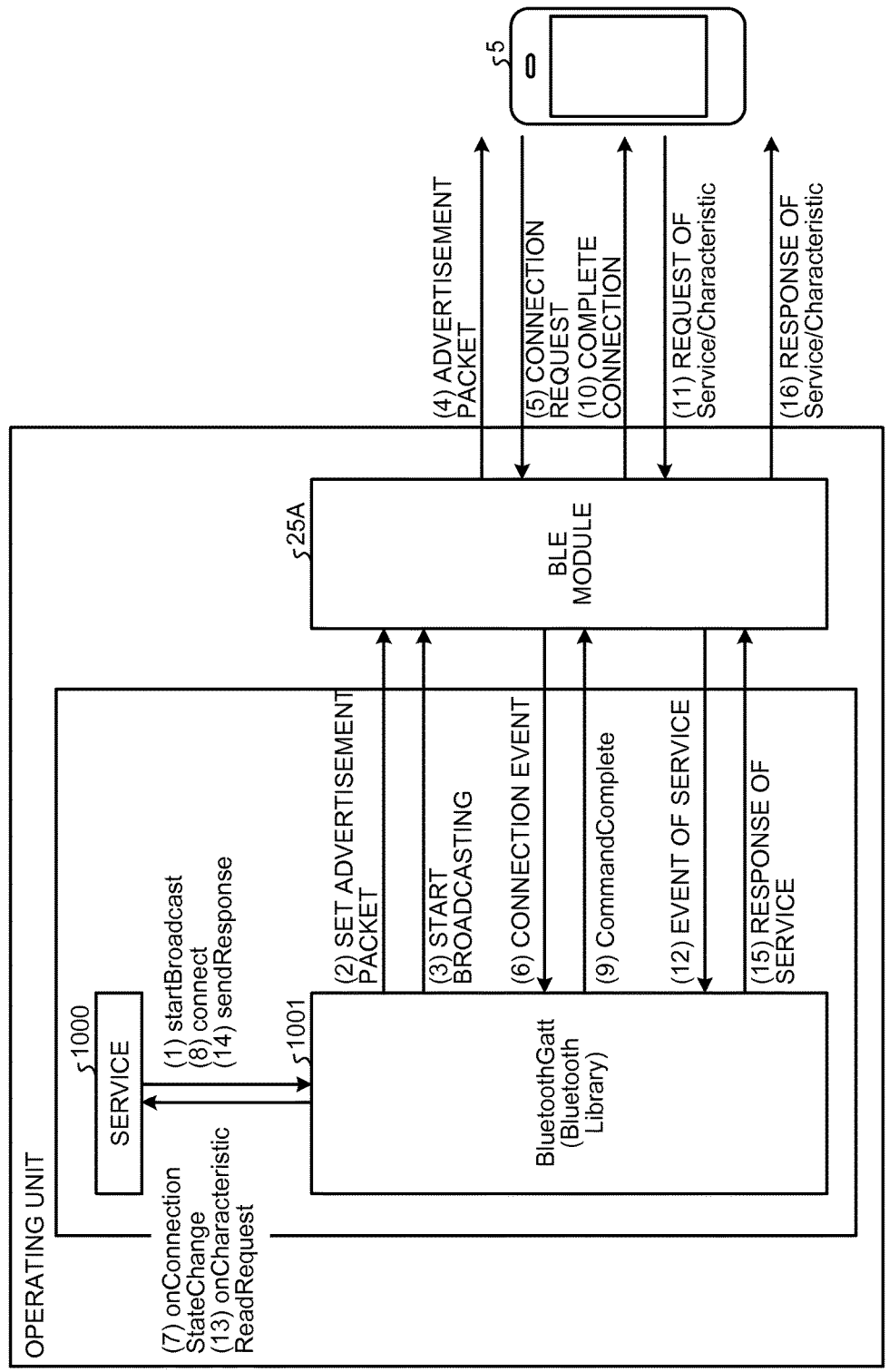

| 0 | NUMBER OF BYTES OF FIRST BLOCK | |
|---|---|---|
| 1 | FLAG | |
| 2 | | |
| 3 | NUMBER OF BYTES OF SECOND BLOCK | |
| 4 | AD TYPE | |
| 5 | COMPANY ID | 0x00C IS APPLE |
| 6 | | |
| 7 | DATA TYPE | 0x02 IS iBeacon |
| 8 | NUMBER OF BYTES OF iBeacon DATA | |
| 9 | | |
| ~ | UUID | 16 BYTES |
| 24 | | |
| 25 | MAJOR | 4 BYTES |
| 26 | | |
| 27 | MINOR | 4 BYTES |
| 28 | | |
| 29 | RADIO FIELD INTENSITY | USED AS REFERENCE VALUE DURING DISTANCE CALCULATION |

MAJOR row — 1901
MINOR row — 1902

ADDING OR UPDATING AT LEAST ONE SERVICE OF A GENERIC ATTRIBUTE PROFILE

CROSS-REFERENCE TO RELATED APPLICATIONS

The present application claims priority to and incorporates by reference the entire contents of Japanese Patent Application No. 2014-235639 filed in Japan on Nov. 20, 2014.

BACKGROUND OF THE INVENTION

1. Field of the Invention

The present invention relates to a data communication device, a data communication method, and a computer-readable recording medium.

2. Description of the Related Art

There are conventionally-used technologies for connecting devices by using a wireless communication. Bluetooth (registered trademark) is disclosed as a standard of the wireless communication for connecting devices.

In a case where devices are connected by using Bluetooth (registered trademark), a connection can be established if the same profile is set to the peripheral (the peripheral device: e.g., keyboard) and the central (the device that uses the peripheral device: e.g., smartphone) (see, for example, Japanese Patent Application Laid-open No. 2013-126003). By the way, conventional devices are provided as products after a predetermined profile is stored in the firmware.

However, in a case where multiple services are provided by using a profile called Generic Attribute Profile (GATT), if services are added, changed, or the like, by using the program that defines the communication with a device, there are problems in that it is difficult to ensure the consistency, and it is difficult to make customization in a flexible manner.

In view of the above-mentioned conventional problems, there is a need to provide a data communication device, a data communication method, and a computer-readable recording medium having a data communication program so as to facilitate service additions or changes.

SUMMARY OF THE INVENTION

It is an object of example embodiments of the present invention to at least partially solve the problems in the conventional technology.

According to example of embodiments of the present invention, there is provided a data communication device comprising: a communication unit that performs a communication in accordance with a standard of a short-range wireless communication; a storage unit that stores therein, among profiles that conform to the standard of the short-range wireless communication and that define a method of using a protocol, a first profile in which multiple services are settable and in which identification information is related to the services; and an arbitrating unit that, when an application is to be installed, adds or updates a service used by the application with regard to the first profile in accordance with identification information that is related to the service.

Example embodiments of the present invention also provide a data communication method that is implemented by a data communication device, the data communication method comprising: by the data communication device that includes a storage unit that stores, among profiles that conform to a standard of a short-range wireless communication and that define a method of using a protocol, a first profile in which multiple services are settable and in which identification information is related to the services, performing a communication in accordance with the standard of the short-range wireless communication; and when an application is to be installed, adding or updating a service used by the application with regard to the first profile in accordance with identification information that is related to the service.

Example embodiments of the present invention also provide a non-transitory computer-readable medium that contains a computer program that causes a computer to execute: performing a communication in accordance with a standard of a short-range wireless communication; storing, in a storage unit, among profiles that conform to the standard of the short-range wireless communication and that define a method of using a protocol, a first profile in which multiple services are settable and in which identification information is related to the services; and when an application is to be installed, adding or updating a service used by the application with regard to the first profile in accordance with identification information that is related to the service.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram that illustrates an example of each item that is included in the service that is registered in the GATT profile according to the embodiment;

FIG. 9 is a diagram that illustrates an example of the service that is registered in the GATT profile by using the XML format according to the embodiment;

FIG. 10 is a diagram that illustrates an example of the data flow that is performed by the operating unit according to the embodiment;

DETAILED DESCRIPTION OF THE PREFERRED EMBODIMENTS

With reference to the attached drawings, a detailed explanation is given below of an embodiment of a data communication device, a data communication method, and a computer-readable recording medium having a data communication program.

Figure 1:
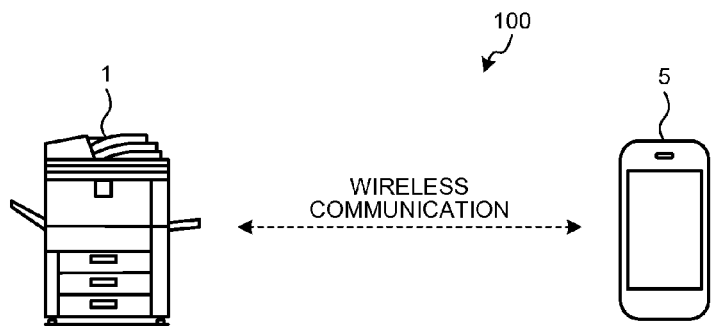
FIG. 1 is a diagram that illustrates an example of the configuration of a data communication system according to an embodiment of the present invention.

FIG. 1 is a diagram that illustrates an example of the configuration of a data communication system 100 according to the embodiment. As illustrated in FIG. 1, the data communication system 100 includes an MFP 1 and a smartphone 5. Each of the MFP 1 and the smartphone 5 includes a wireless communication interface. The wireless communication interface conforms to a standard of a short-range wireless communication that enables a communication between multiple devices if the devices are compatible with the profile that defines the method of using a protocol in accordance with a purpose and, according to the present embodiment, it conforms to Bluetooth (registered trademark).

In the example illustrated in FIG. 1, the MFP 1 is on a peripheral (peripheral device) side, and the smartphone 5 on a central (a device that uses the peripheral device) side.

By installing an application, the MFP 1 according to the present embodiment is capable of providing a service by using a function that is based on the installed application. For example, if a new scanner application is installed, it is possible to provide data that is heretofore difficult to be referred to, such as the information on a new scanner mode that is provided by the application, counter information, or job logs. The service for providing the data may be added as a new service to the profile of Bluetooth (registered trademark) or may be additionally extended as part of the existing service.

According to the present embodiment, the GATT profile is used as the profile to which a new service is added or additionally extended as part of the existing service.

The GATT (Generic Attribute Profile) is the profile that makes it possible to add a program that defines the communication with a device later on, and it includes three elements that are referred to as a service, characteristic, and descriptor. The GATT profile can set one or more services. Furthermore, by adding or partially extending a service of the GATT profile, it is possible to add a new function or change a function.

In the GATT profile, a service represents a single function in the profile. According to the present embodiment, an XML-format file is used so that a service includes multiple nested services and multiple characteristics.

Furthermore, the characteristic represents the attribute information that has a single value. The characteristic includes the value of the characteristic itself, the property that defines the method of accessing the value, and multiple descriptors.

The descriptor represents the attribute information that is used when additional information is needed for the characteristic. Furthermore, the descriptor is not sometimes defined for some characteristics.

According to the present embodiment, in order to identify a service and a characteristics, a universally unique identifier (UUID), which is unique identification information, is assigned to each service and characteristics.

Figure 2:
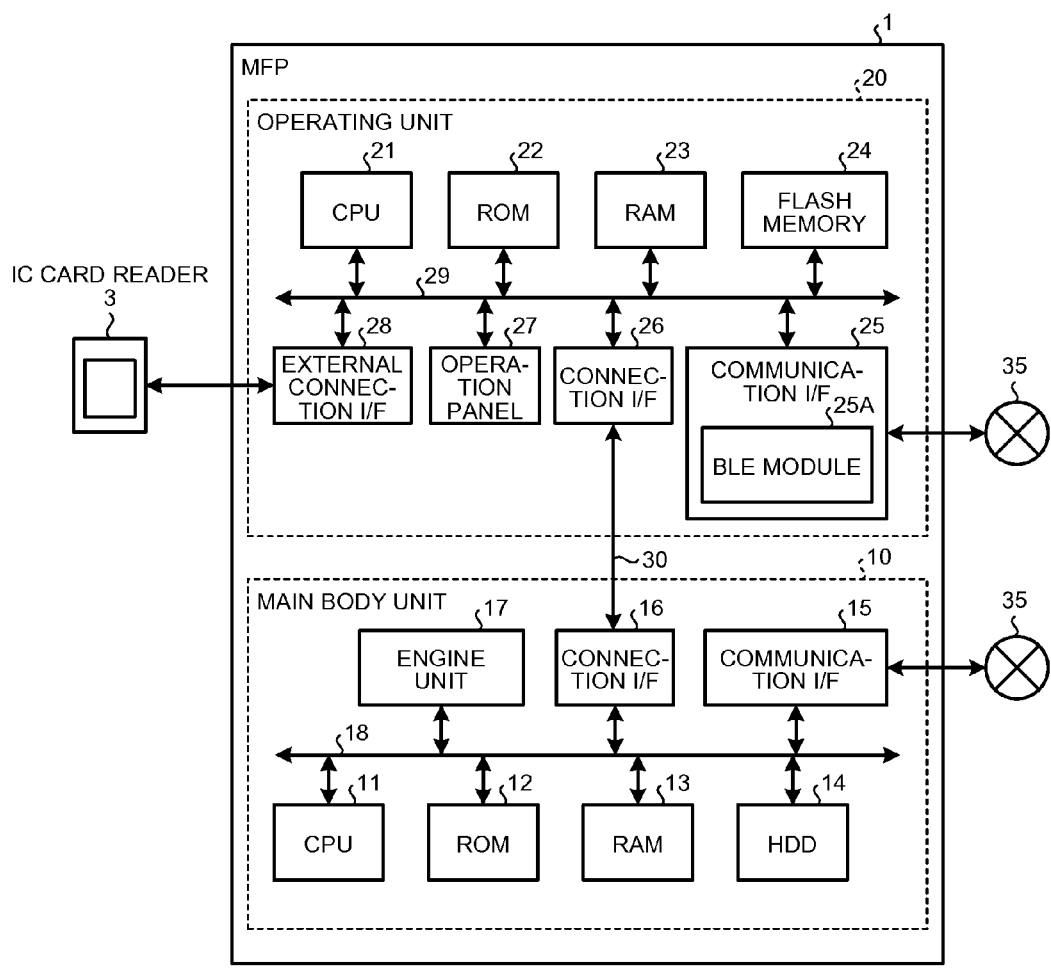
FIG. 2 is a diagram that illustrates an example of the hardware configuration of an MFP according to the embodiment.

Next, an explanation is given of an example of the hardware configuration of the MFP 1. FIG. 2 is a diagram that illustrates an example of the hardware configuration of the MFP 1 according to the embodiment. As illustrated in FIG. 2, the MFP 1 includes a main body unit 10 and an operating unit 20. The main body unit 10 implements various functions, such as a copier function, scanner function, fax function, or printer function. The operating unit 20 receives information in accordance with a user's operation. Here, the information in accordance with a user's operation refers to, for example, a signal that indicates the coordinate values on a screen.

The main body unit 10 and the operating unit 20 are communicatively connected to each other via a connection I/F 16, a dedicated communication path 30, and a connection I/F 26. The communication path 30 may use, for example, the Universal Serial Bus (USB) standard; however, it may be any standard regardless of whether it is wired or wireless.

The main body unit 10 performs an operation in accordance with an operation that is received by the operating unit 20. Furthermore, the main body unit 10 is capable of communicating with an undepicted external device, such as a client personal computer (PC), and it is capable of performing an operation in accordance with a command (print command, or the like) that is received from the external device.

An explanation is given of a hardware configuration of the main body unit 10. As illustrated in FIG. 2, the main body unit 10 includes a CPU 11, a ROM 12, a RAM 13, a hard disk drive (HDD) 14, a communication I/F 15, the connection I/F 16, and an engine unit 17. The CPU 11, the ROM 12, the RAM 13, the HDD 14, the communication I/F 15, the connection I/F 16, and the engine unit 17 are connected to one another via a system bus 18.

The CPU 11 controls an operation of the main body unit 10 in an integrated manner. The CPU 11 uses the RAM 13 as a work area to execute a program that is stored in the ROM 12, the HDD 14, or the like, so as to control the overall operation of the main body unit 10 and implement the above-described various functions, such as a copier function, scanner function, fax function, or printer function.

The communication I/F 15 is an interface for connecting to a network 35. The connection I/F 16 is an interface for communicating with the operating unit 20 via the communication path 30.

The engine unit 17 is the hardware that performs processing other than general-purpose information processing and communication in order to implement a copier function, scanner function, fax function, or printer function. For example, it includes a scanner that scans and reads images of an original document, a plotter that conducts printing on a sheet material such as paper, or a fax unit that performs a fax communication. The engine unit 17 may further include the hardware for implementing a specific option, such as a finisher that sorts printed sheet materials, or an automatic document feeder (ADF) that automatically feeds original documents.

Next, an explanation is given of a hardware configuration of the operating unit 20. As illustrated in FIG. 2, the operating unit 20 includes a CPU 21, a ROM 22, a RAM 23, a flash memory 24, a communication I/F 25, the connection I/F 26, an operation panel 27, and an external connection I/F 28. The CPU 21, the ROM 22, the RAM 23, the flash memory 24, the communication I/F 25, the connection I/F 26, the operation panel 27, and the external connection I/F 28 are connected to one another via a system bus 29.

The CPU 21 controls an operation of the operating unit 20 in an integrated manner. The CPU 21 uses the RAM 23 as a work area to execute a program that is stored in the ROM 22, the flash memory 24, or the like, so as to control the overall operation of the operating unit 20 and conduct, for example, a display of information (images) in accordance with an input that is received from a user.

The communication I/F 25 is an interface for connecting to the network 35. Furthermore, the communication I/F 25 includes a BLE module 25A. The BLE module 25A is a module that is compatible with the BLE (Bluetooth 4.0 low energy) standard. As the communication I/F 25 has the BLE module 25A installed therein, it serves as a communication unit that performs a wireless communication with a different device that is compatible with the BLE standard in accordance with the standard of a short-range wireless communication. In the present embodiment, an explanation is given of a case where the BLE standard is used as the standard of a short-range wireless communication that enables a communication between multiple devices if the devices are compatible with the profile that defines the method of using a protocol in accordance with a purpose; however, different communication standards may be used.

The connection I/F 26 is an interface for communicating with the main body unit 10 via the communication path 30.

The operation panel 27 receives various types of inputs in accordance with a user's operation and displays various types of information (e.g., the information that corresponds to the received operation, the information that indicates the operation status of the MFP 1, or the information that indicates the setting status). The operation panel 27 according to the present embodiment includes a liquid crystal display device (LCD) that has a touch-panel function; however, this is not a limitation. For example, it may include an organic EL display device that has a touch-panel function. Furthermore, in addition to or instead of the above, an operating unit such as a hardware key or an indication unit such as a lamp may be provided.

The external connection I/F 28 is an interface for connecting to the IC card reader 3.

Figure 3:
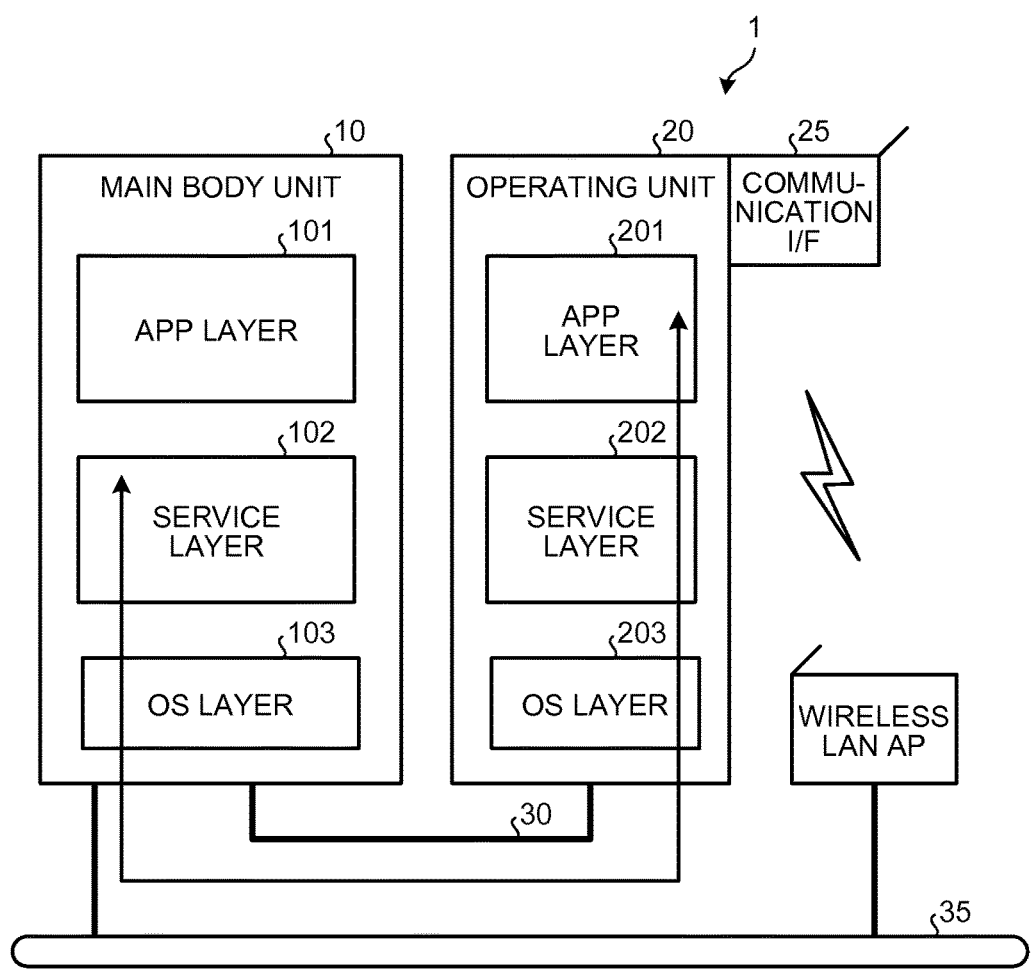
FIG. 3 is a diagram that illustrates an example of the software configuration of the MFP according to the embodiment.

Next, an explanation is given of a software configuration of the MFP 1. FIG. 3 is a diagram that illustrates an example of the software configuration of the MFP 1 according to the present embodiment. As illustrated in FIG. 3, the main body unit 10 includes an app layer 101, a service layer 102, and an OS layer 103. The app layer 101, the service layer 102, and the OS layer 103 are actually various types of software that are stored in the ROM 12, the HDD 14, or the like (see FIG. 2). The CPU 11 executes the software, thereby providing various functions.

The software of the app layer 101 is the application software (in the following explanation, sometimes simply referred to as the "app") for providing a predetermined function by operating the hardware resources. For example, the apps include a copier app for providing the copier function, a scanner app for providing the scanner function, a fax app for providing the fax function, or a printer app for providing the printer function.

The software of the service layer 102 is the software that is interposed between the app layer 101 and the OS layer 103 and that provides an app with the interface for using the hardware resources that are included in the main body unit 10. More specifically, it is the software for providing the functions to receive an operation request with regard to the hardware resources and to arbitrate operation requests. Possible operation requests that are received by the service layer 102 are requests for reading by the scanner, printing by the plotter, or the like.

Here, the function of the interface by the service layer 102 is provided to not only the app layer 101 of the main body unit 10 but also an app layer 201 of the operating unit 20. That is, the app layer 201 (app) of the operating unit 20 is also capable of implementing the function that uses the hardware resources (e.g., the engine unit 17 of FIG. 2) of the main body unit 10 via the interface function of the service layer 102.

The software of the OS layer 103 is the basic software (operating system) for providing the basic function to control the hardware that is included in the main body unit 10. The software of the service layer 102 converts the request to use the hardware resources from various apps into a command that is interpretable by the OS layer 103 and delivers it to the OS layer 103. Then, the command is executed by the software of the OS layer 103 so that the hardware resources perform an operation in accordance with the request from the app.

Similarly, the operating unit 20 includes the app layer 201, a service layer 202, and an OS layer 203. The app layer 201, the service layer 202, and the OS layer 203 included in the operating unit 20 also have the same layered system as that of the main body unit 10. However, the function that is provided by an app of the app layer 201 and the type of operation request that can be received by the service layer 202 are different from those of the main body unit 10. Although an app of the app layer 201 may be the software for providing a predetermined function by operating the hardware resources that are included in the operating unit 20, it is primarily the software for providing the function of a user interface (UI) to perform an operation or display related to the functions (copier function, scanner function, fax function, or printer function) that are included in the main body unit 10.

Furthermore, according to the present embodiment, in order to maintain the independence of functions, the software of the OS layer 103 of the main body unit 10 is different from the software of the OS layer 203 of the operating unit 20. Specifically, the main body unit 10 and the operating unit 20 are operated separately from each other by using different operating systems. For example, Linux (registered trademark) may be used as the software of the OS layer 103 of the main body unit 10, and Android (registered trademark) may be used as the software of the OS layer 203 of the operating unit 20.

As described above, in the MFP 1 according to the embodiment, the main body unit 10 and the operating unit 20 are operated with different operating systems; therefore, the communication between the main body unit 10 and the operating unit 20 is performed as not the interprocess communication within the same device but the communication between different devices. Examples of the communication between different devices include an operation (command communication) to transmit, to the main body unit 10, information (details of a command from a user) that is received by the operating unit 20 or an operation to notify an event to the operating unit 20 by the main body unit 10. Here, the operating unit 20 performs a command communication with the main body unit 10 so that a function of the main body unit 10 may be used. Furthermore, the events that are notified by the main body unit 10 to the operating unit 20 include the execution status of an operation by the main body unit 10, the information that is set by the main body unit 10, or the like.

Furthermore, according to the present embodiment, the power is supplied to the operating unit 20 from the main body unit 10 via the communication path 30. Therefore, the power control on the operating unit 20 may be performed separately (independently) from the power control on the main body unit 10.

Figure 4:
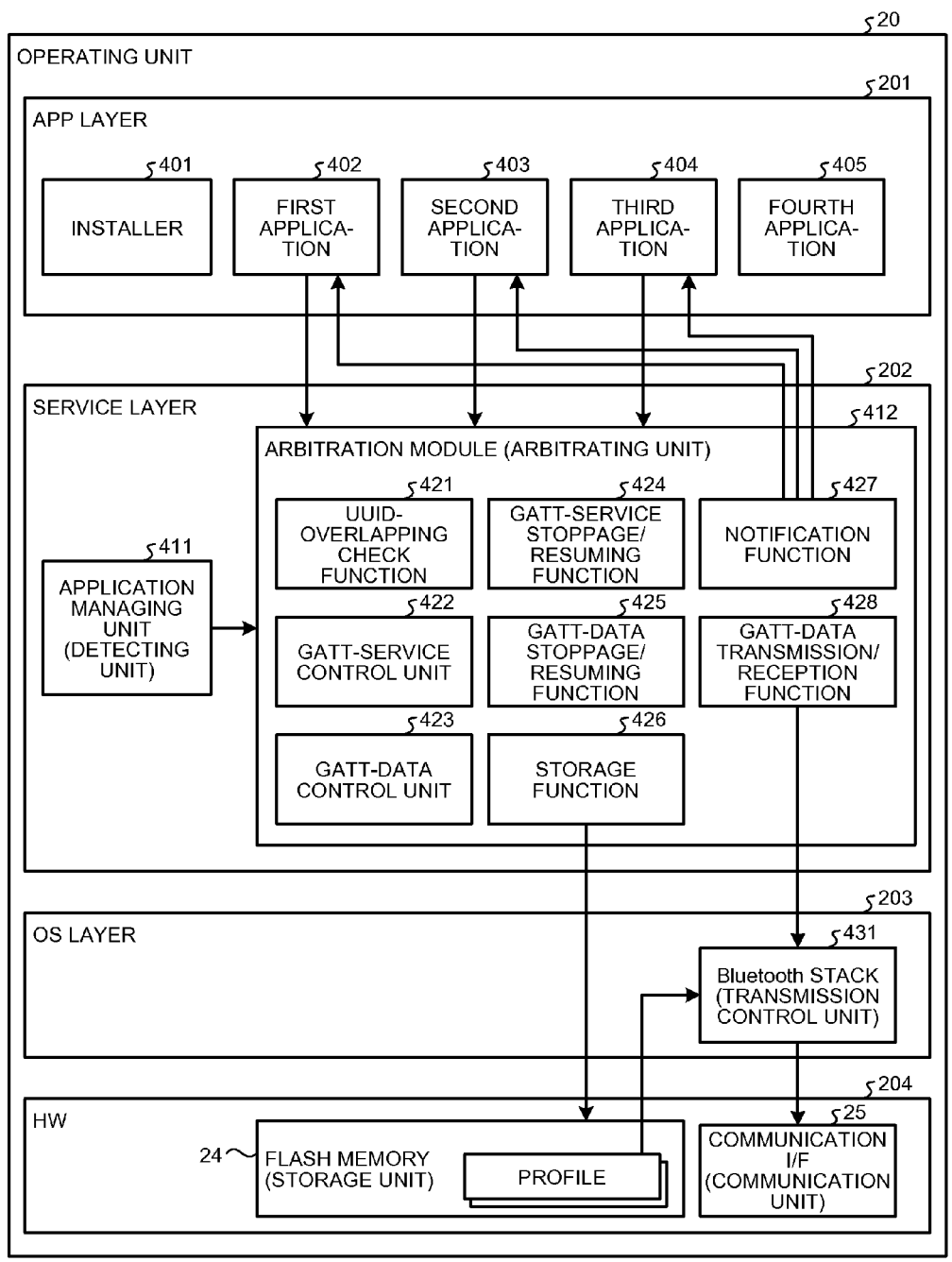
FIG. 4 is a diagram that illustrates an example of the functional configuration of an operating unit according to the embodiment.

Next, an explanation is given of a functional configuration of the operating unit 20. FIG. 4 is a diagram that illustrates an example of the functional configuration of the operating unit 20. In the example illustrated in FIG. 4, the operating unit 20 includes, sequentially starting from the upper layer, the app layer 201, the service layer 202, the OS layer 203, and a hardware layer 204.

The app layer 201 includes an installer 401, a first application 402, a second application 403, a third application 404, and a fourth application 405.

The installer 401 controls installation (addition) of an application by a user via a UI.

When a new application is to be installed in the app layer 201, the application requests an arbitration module 412 of the service layer 202 to register a service in the GATT profile.

In response to the above-described registration request, the arbitration module 412 according to the present embodiment adds the service to the GATT profile to perform a Bluetooth (registered trademark) wireless communication. Then, the application, which has requested the arbitration module 412 to register the service, may perform a wireless communication by using the service that is registered in the GATT profile. Furthermore, various notifications may be received from the arbitration module 412.

The service layer 202 includes an application managing unit 411 and the arbitration module 412.

The application managing unit 411 performs management as to whether each application installed in the app layer 201 is in the activated state or the stopped state. Furthermore, the application managing unit 411 notifies the arbitration module 412 of the state of each application. That is, the application managing unit 411 serves as a detecting unit that detects whether the installed program is activated.

The arbitration module 412 includes a UUID-overlapping check function 421, a GATT-service control unit 422, a GATT-data control unit 423, a GATT-service stoppage/resuming function 424, a GATT-data stoppage/resuming function 425, a storage function 426, a notification function 427, and a GATT-data transmission/reception function 428.

The arbitration module 412 according to the present embodiment adds a service, characteristic, or the like, to a GATT profile in response to a request from the installed application.

Furthermore, according to the present embodiment, a UUID is related to each service or characteristic that is used by the application installed in the app layer 201 of the MFP 1.

Figure 5:
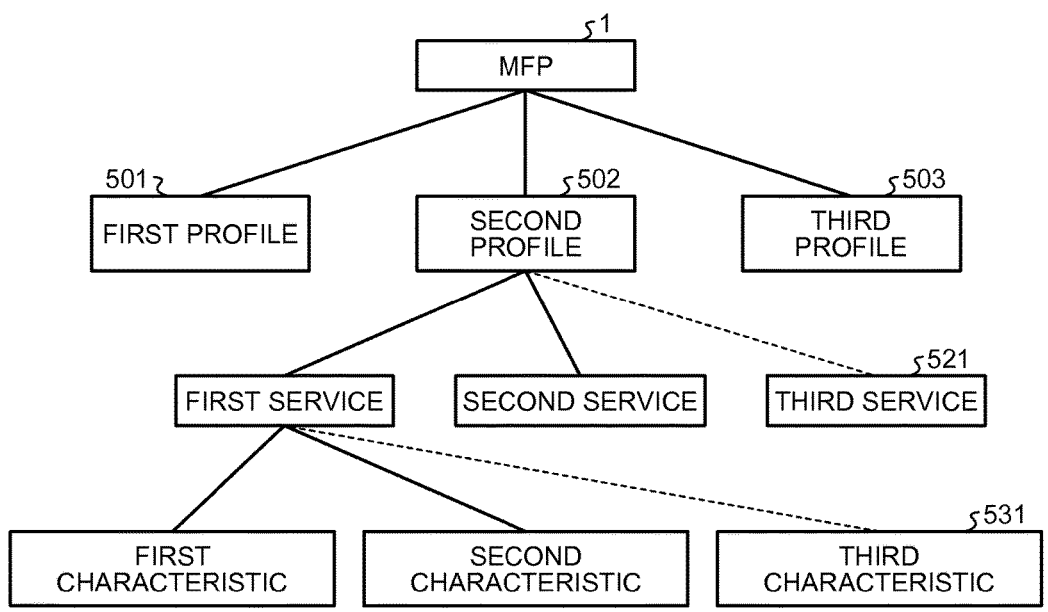
FIG. 5 is a diagram that illustrates an example of the structures of a profile and a service that are used in Bluetooth (registered trademark) of the MFP according to the embodiment.

FIG. 5 is a diagram that illustrates an example of the structures of a profile and a service that are used in Bluetooth (registered trademark) of the MFP 1 according to the present embodiment. The MFP 1 may include multiple profiles. Furthermore, in the example illustrated in FIG. 5, a first profile 501, a second profile 502, and a third profile 503 are provided. Examples of the profile include HID, HFP, HSP, A2DP, SPP, or GATT.

In the example illustrated in FIG. 5, the second profile 502 is a GATT profile, and it may include multiple services. Furthermore, one or more characteristics (hereinafter, also referred to as data) may be defined in the lower layer below the service.

Together with installation of an application, the arbitration module 412 may add a service (e.g., a third service 521) or partially extend a service, in other words, add data (e.g., a third characteristic 531).

Figure 6:
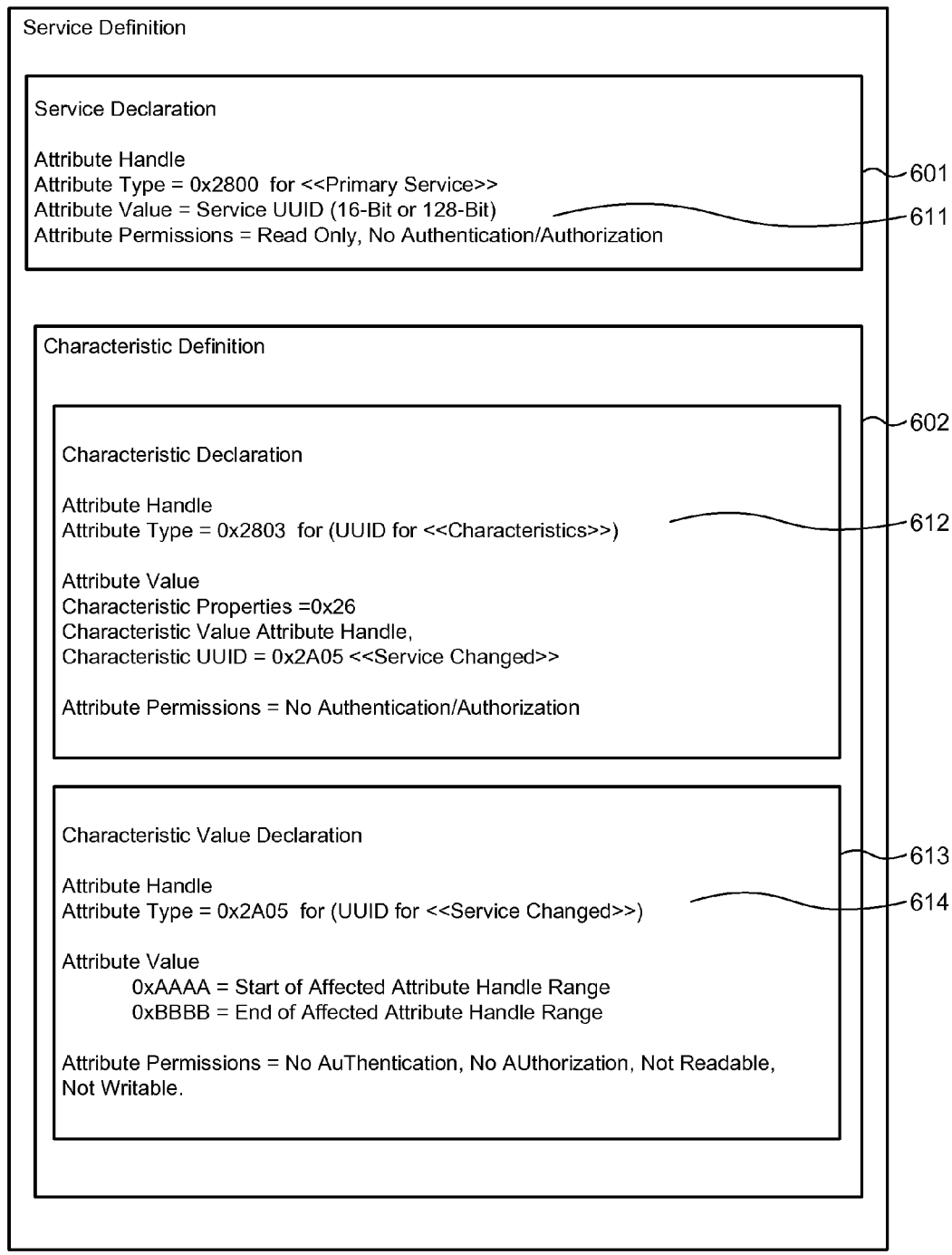
FIG. 6 is a diagram that illustrates an example of the data format of a service that constitutes a GATT profile according to the embodiment.

FIG. 6 is a diagram that illustrates an example of the data format of a service that constitutes the GATT profile. As illustrated in FIG. 6, the definition of the service ("Service Definition") includes "Service Declaration" 601 and the definition of a characteristic ("Characteristic Definition") 602.

With regard to the service, "Attribute Handle", "Attribute Type", "Attribute Value" 611, "Attribute Permissions" are defined. The universally unique identifier (UUID) that is assigned to the service is set in the "Attribute Value" 611.

With regard to the characteristic, "Attribute Handle", "Attribute Type" 612, "Attribute Value", and "Attribute Permissions" are defined. The universally unique identifier (UUID) that is assigned to the characteristic is set in the "Attribute Type" 612.

For example, by adding "Characteristic Value Declaration" 613, a characteristic may be added to the existing service. Furthermore, with regard to the added "Characteristic Value Definition" 613, the universally unique identifier (UUID) that is assigned to the characteristic is set in "Attribute Type" 614.

According to the present embodiment, a UUID is previously defined for each service or characteristic that is used by each application. Thus, when an application is installed, a service or a characteristic may be added without being overlapped with a service or a characteristic of a different application. Next, with reference back to FIG. 4, an explanation is given of each configuration of the arbitration module 412.

With reference back to FIG. 4, the arbitration module 412 serves as an arbitrating unit that adds or updates the service used by the application to be installed with regard to the GATT profile on the basis of the UUID that is related to the service.

According to the present embodiment, when the arbitration module 412 adds or updates a service, the UUID-overlapping check function 421 determines whether the UUID that is assigned to the service stored in the GATT profile is overlapped.

Furthermore, if the UUID-overlapping check function 421 determines that the GATT profile does not store a different service to which the same UUID as that of a first service used by the application to be installed is assigned (determines that there are no overlaps), the GATT-service control unit 422 of the arbitration module 412 adds the first service to the GATT profile.

According to the present embodiment, the same UUID is not assigned to a different service that is used by a different application; however, if multiple applications that have the same function are installed, or if the already installed application is upgraded, it is possible that the service with the same UUID is added. In such a case, it is preferable to update the service.

Therefore, if the UUID-overlapping check function 421 determines that the GATT profile stores a different service to which the same UUID as that of the first service used by the application to be installed is assigned (determines that there is an overlap), the GATT-service control unit 422 of the arbitration module 412 updates the different service that is stored in the GATT profile by using the first service. Here, according to the present embodiment, an update may be made only if addition permission is set.

As described above, according to the present embodiment, when an application is installed, the UUID-overlapping check function 421 determines whether the UUID of the service used by the application and the UUID of the characteristic are overlapped with the UUID of the service and the UUID of the characteristic that are already registered in the GATT profile.

The GATT-service control unit 422 controls the service of the GATT profile in accordance with an application. For example, when the application is installed, addition of the service, update (extension) to the existing service, or the like, is conducted on the GATT profile.

In accordance with the application, the GATT-data control unit 423 controls the characteristic that is used by the application. For example, when the application is installed, addition of the characteristic, or the like, is conducted on the GATT profile.

The storage function 426 conducts storage in the flash memory 24. For example, the storage function 426 relates the application to the UUIDs of the service and the characteristic that are used by the application for storage.

The flash memory 24, which is the hardware, serves as a storage unit that stores a profile. According to the present embodiment, at least a GATT profile is stored; however, a different profile may be stored. Furthermore, the flash memory 24 stores a management table that is described later.

A process name (process ID) is assigned to the installed application and, during installation, the process name (process ID) is also registered. Furthermore, together with the process name (process ID), the storage function 426 of the arbitration module 412 relates the process name (process ID) and the UUID and registers them in the (undepicted) management table, whereby it is possible to understand what kind of service is present and to check whether UUIDs are overlapped. Thus, according to the present embodiment, the correspondence relationship between the application and the service is managed by using the management table. Furthermore, the correspondence relationship between the application and the characteristic may be managed by using the management table.

According to the present embodiment, the management table stores the correspondence relationship between the application (process ID) and the service (UUID) or the characteristic; thus, if a request to write data (characteristic) is made by the central, the application to be activated may be identified. Then, when the identified application is activated, the notification function 427 notifies the application that the writing request has been made. At that point, the written data, or the like, may be transmitted.

Furthermore, when the application is uninstalled, the service and characteristic to be deleted may be identified. Moreover, in accordance with the activated state of the application, stoppage/activation of the service may be controlled.

The GATT-service stoppage/resuming function 424 controls stoppage or resuming of the service used by the application in accordance with the application state that is detected by the application managing unit 411.

The GATT-data stoppage/resuming function 425 controls stoppage or activation of the characteristic used by the application in accordance with the application state that is detected by the application managing unit 411.

As described above, the GATT-service stoppage/resuming function 424 and the GATT-data stoppage/resuming function 425 according to the present embodiment perform a control such that the service and the characteristic related to an application may be used only while the application is activated.

Furthermore, when the main body of the MFP 1 makes a shift for energy saving or is returned or it activates or stops a process, the GATT-service stoppage/resuming function 424 performs a control so as to activate or stop each service. Similarly, when the main body of the MFP 1 makes a shift for energy saving or is returned or it activates or stops a process, the GATT-data stoppage/resuming function 425 performs a control so as to activate or stop each characteristic.

According to the present embodiment, if the central side (e.g., the smartphone 5) makes a write (in the case of the data that has write authority) request to the data (characteristic) of the GATT profile, it is notified to the arbitration module 412 via the communication I/F 25 and a Bluetooth stack 431.

Then, by using the data (characteristic) in the GATT profile for which the write request has been made, the arbitration module 412 identifies the service that includes the characteristic. Furthermore, the arbitration module 412 identifies which application uses it on the basis of the management table that manages the correspondence relationship between the service and the application. Furthermore, after the arbitration module 412 performs a control so as to activate the application, it performs a control so as to write the data.

The writing control is intended for the type of characteristic, which is set in the GATT profile, that contains not only the read attribute but also the write attribute. If it has the write attribute, data can be written from the peripheral side to the central side.

The notification function 427 makes a notification to each application that is stored in the app layer 201.

For example, if the arbitration module 412 detects that an access has been made by the central side via the Bluetooth stack 431, the notification function 427 makes a notification to activate the application for which the access is intended.

The GATT-data transmission/reception function 428 may transmit and receive data to and from an external device via the Bluetooth stack 431.

The OS layer 203 stores the Bluetooth stack 431. The Bluetooth stack 431 is the driver for using Bluetooth (registered trademark) by the operating unit 20, and it conforms to multiple profiles that include a GATT profile. For example, the Bluetooth stack 431 uses the GATT profile to provide various services that are registered in the GATT profile. In the following, the library that can be invoked when the Bluetooth stack 431 uses the GATT profile is also referred to as BluetoothGatt.

For example, the Bluetooth stack 431 serves as a transmission control unit that performs a control on transmission via the communication I/F 25 in response to a request from the GATT-data transmission/reception function 428. For example, the Bluetooth stack 431 performs a control on transmission of an advertisement packet to an external device via the communication I/F 25 in response to a request from the GATT-data transmission/reception function 428.

Furthermore, the Bluetooth stack 431 may serve as a reception control unit that performs a control on reception of information from an external device via the communication I/F 25 in response to a request from the GATT-data transmission/reception function 428.

Figure 7:
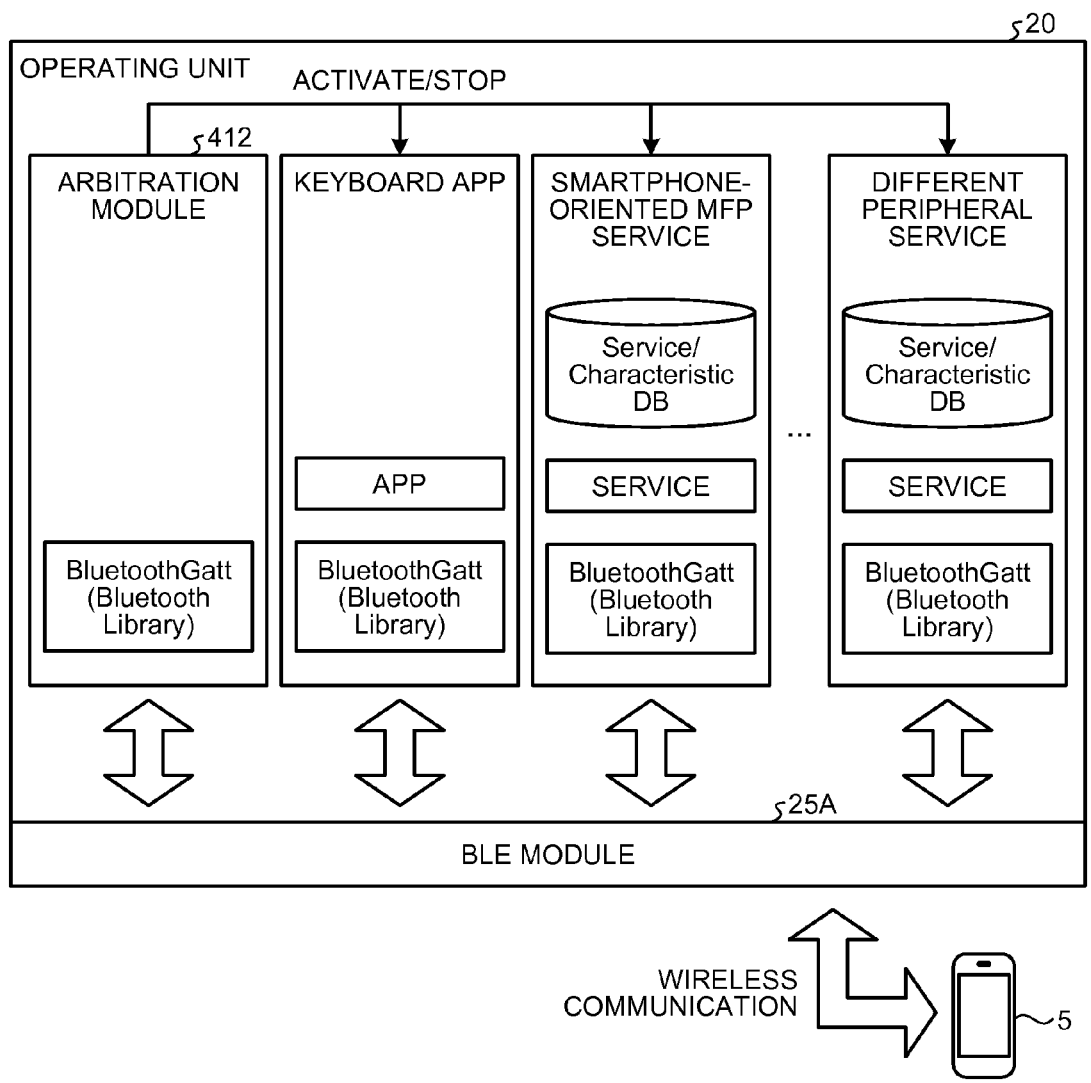
FIG. 7 is a diagram that illustrates an example of the control that is performed by an arbitration module in the operating unit according to the embodiment.

FIG. 7 is a diagram that illustrates an example of the control that is performed by the arbitration module 412 in the operating unit 20. As illustrated in FIG. 7, the arbitration module 412 activates or stops each application (e.g., a keyboard app) or each service (e.g., smartphone-oriented MFP service or different peripheral service) in synchronization with timing in which the MFP 1 makes a shift for energy saving or is returned. The notification function 427 of the arbitration module 412 may be used for the above control. Furthermore, the operation to reject a shift for energy saving, or the like, is performed by the arbitration module 412 as a representative so that the operation of each service to return from energy saving may be synchronized. Moreover, the loads of each service may be reduced.

Furthermore, if the operating unit 20 has two functions, i.e., the central and the peripheral, it is difficult to simultaneously operate the central and the peripheral. Therefore, the arbitration module 412 makes a switchover after stopping the entire operating unit 20, whereby the occurrence of mismatch in the operation mode is prevented. Furthermore, if there is a service being executed, the arbitration module 412 rejects stoppage of the service or rejects mode switchover (for example, switchover from the peripheral to the central).

FIG. 8 is a diagram that illustrates an example of each item (characteristic) that is included in the service that is registered in the GATT profile according to the present embodiment. The example that is depicted in FIG. 8 illustrates a part of the items (characteristics) that are needed for the function to hand over from Bluetooth (registered trademark) to Wi-Fi Direct in order to deliver the IP address of the MFP 1 or the connection information on a wireless LAN. Furthermore, as illustrated in FIG. 8, according to the present embodiment, a UUID is related to each item. Moreover, according to the present embodiment, type (the type of variable), properties, permissions (e.g., write authority, read authority, or execution authority), and value (fixed value) are related to each item.

FIG. 9 is a diagram that illustrates an example of the service that is registered in the GATT profile by using the XML format. In the example illustrated in FIG. 9, the service that is illustrated in FIG. 8 is registered in an area 901. By using the XML format that is illustrated in FIG. 9, it is possible to designate the value and the type of a characteristic. Furthermore, as the XML format is used by the application for the data that is registered in the arbitration module 412, an easily customizable format may be provided.

FIG. 10 is a diagram that illustrates an example of the data flow that is performed by the operating unit 20 according to the present embodiment. In the example illustrated in FIG. 10, a service 1000 that is used by an application, or the like, transmits and receives data to and from the smartphone 5 by using BluetoothGatt.

First, (1) the service 1000 outputs "startBroadcast" to BluetoothGatt 1001 and gives an instruction to start broadcasting. Then, (2) the BluetoothGatt 1001 sets an advertisement packet in accordance with the instruction. Next, (3) the BluetoothGatt 1001 gives an instruction to start broadcasting. Then, (4) the BLE module 25A broadcasts an advertisement packet to find a device.

Then, (5) after receiving the advertisement packet, the smartphone 5 transmits a connection request.

Next, (6) the BluetoothGatt 1001 receives the connection event from the BLE module 25A. (7) The BluetoothGatt 1001 delivers "onConnectionStateChange" to the service 1000. Thus, (8) the service 1000 outputs "connect" to the BluetoothGatt 1001. Thus, a connection is established between the service 1000 and the smartphone 5.

Then, (9) the BluetoothGatt 1001 delivers "CommandComplete" to the BLE module 25A. Thus, (10) the BLE module 25A notifies the smartphone 5 of a connection completion.

Afterward, (11) the smartphone 5 requests a service and a characteristic (Service/Characteristic). Then, (12) the BLE module 25A delivers an event of the service to the BluetoothGatt 1001. (13) The BluetoothGatt 1001 delivers "onCharacteristicReadRequest" to the service 1000. Thus, the characteristic of the service is read.

Then, (14) the service 1000 delivers "sendResponse" to the BluetoothGatt 1001. Thus, the read characteristic is delivered.

Then, (15) the BluetoothGatt 1001 outputs a response of the service to the BLE module 25A. Next, (16) the BLE module 25A transmits the response of the service and the characteristic (Service/Characteristic) to the smartphone 5.

According to the above-described data flow, after a communication is established, the characteristic (data) may be delivered.

Figure 11:
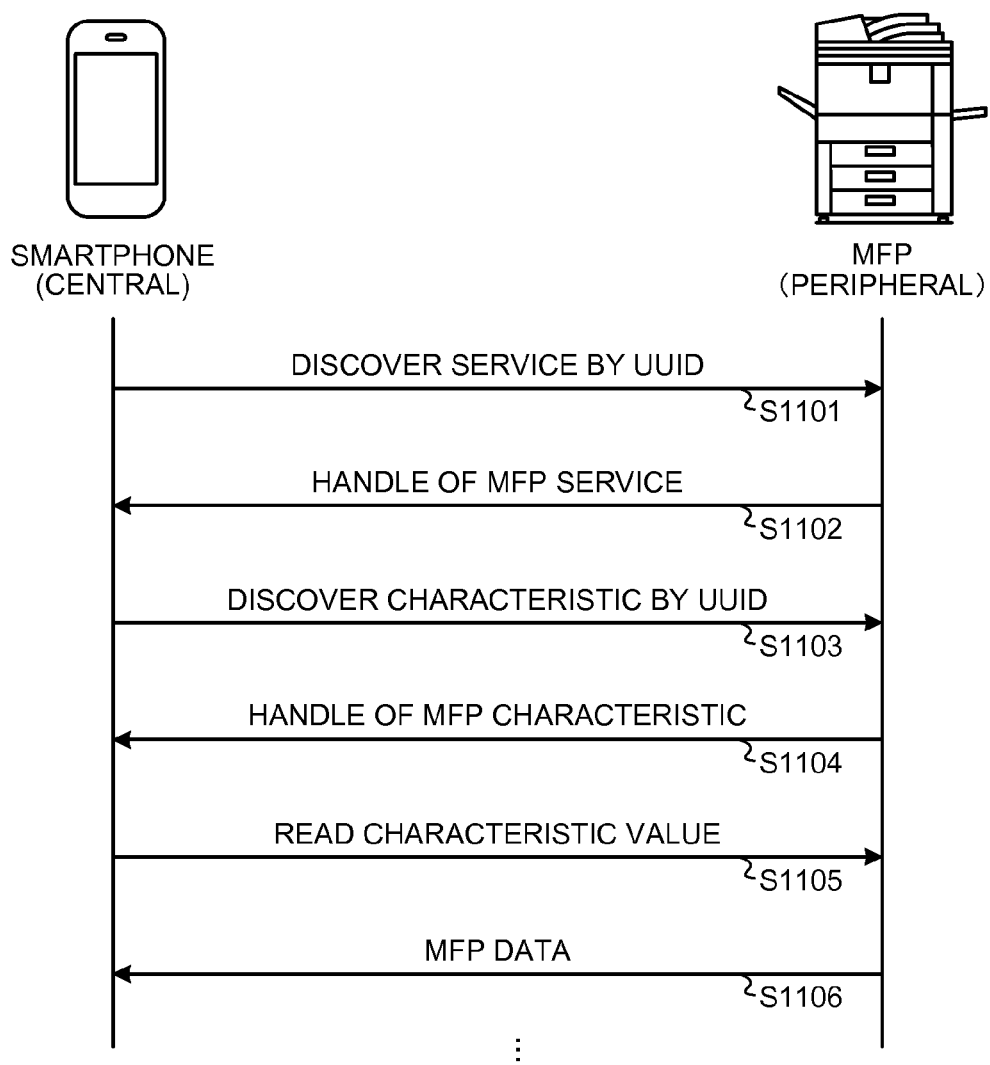
FIG. 11 is a sequence diagram that illustrates an operation that is performed between the MFP according to the embodiment and a smartphone.

Next, an explanation is given of an operation that is performed when data on the MFP 1 is acquired. FIG. 11 is a sequence diagram that illustrates an operation that is performed between the MFP 1 according to the present embodiment and the smartphone 5. In the example illustrated in FIG. 11, the smartphone 5 is on the central side, and the MFP 1 is on the peripheral side.

First, the smartphone 5 uses the "Discovery Service By UUID" Sub procedure that is the "Primary Service Discovery" function of the GATT profile to makes a request to retrieve a service by using the UUID that is defined as the service (e.g., job state, counter information, or sensor information) that is provided by the MFP 1 (Step S1101).

Next, if the requested service matches the provided service, the MFP 1 delivers the handle of the service to the smartphone 5 (Step S1102).

Then, the smartphone 5 uses the "Discovery Characteristic by UUID" Sub procedure of the GATT profile to make a request to retrieve a characteristic (Step S1103).

Next, if the requested characteristic matches the provided characteristic, the MFP 1 delivers the handle of the characteristic to the smartphone 5 (Step S1104).

Then, the smartphone 5 uses the "Read Characteristic Value" Sub procedure that is the "Characteristic Value Read" function of the GATT profile to make a request to acquire the data on the MFP 1 by using the acquired handle of the characteristic of the MFP 1 (Step S1105).

Then, the MFP 1 delivers the requested data to the smartphone 5 (Step S1106). Furthermore, the above-described operation is repeated for each UUID of characteristic, whereby needed data is acquired.

As described above, if an access is made by the central side, the arbitration module 412 uses the delivered UUID to identify the application (process ID) that is related in the management table. If the application is not activated, the arbitration module 412 activates the application and delivers the service handle. If different applications manage data on each characteristic of the same service, the arbitration module 412 identifies the related application on the basis of the UUID of the characteristic that is to be subsequently delivered.

The arbitration module 412 is capable of acquiring, from the application managing unit 411, the information that indicates whether each application is activated. If the central side makes a request to write the data (characteristic) that is defined in the GATT profile, and if it is determined that the application to which a notification is to be made is not activated on the basis of the acquired information, the notification function 427 makes a notification to activate the application. Afterward, the notification function 427 notifies the activated application of a request to write the data.

If the service or the characteristic is changed together with installation of an application, the arbitration module 412 notifies it to central (client side) by using an advertisement packet of Bluetooth (registered trademark).

Figures 12, 13:
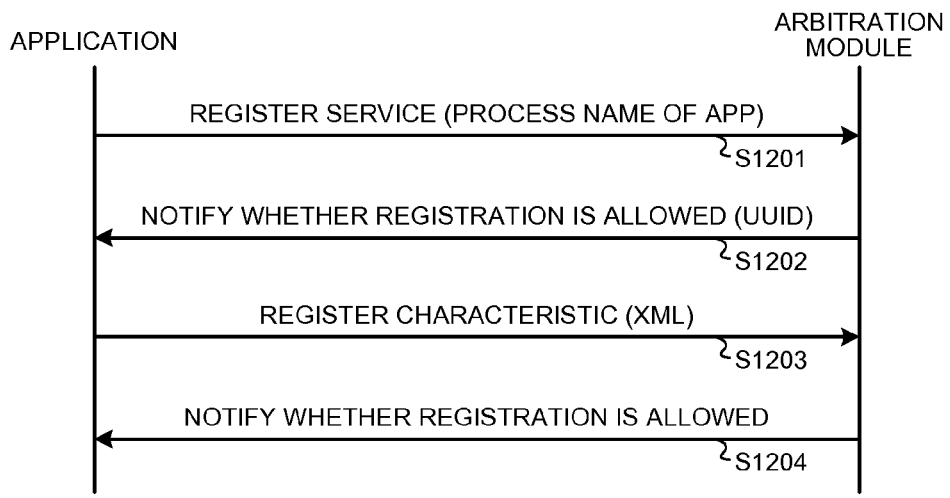
FIG. 12 is a diagram that illustrates an example of the data structure of an advertisement packet according to the embodiment.
FIG. 13 is a sequence diagram that illustrates a registration that is performed when an application is installed in the MFP according to the embodiment.

FIG. 12 is a diagram that illustrates an example of the data structure of an advertisement packet according to the present embodiment. In the data structure that is illustrated in FIG. 12, a major version field 1901 and a minor version field 1902 are used to change a service or a characteristic. For example, if the first bit is 1, it indicates that a change is made after the power of the MFP 1 is turned on. Furthermore, the number may be incremented by one each time a change is made so that the change log may be managed by the client side.

Next, an explanation is given of the operation that is performed when an application is installed in the MFP 1. FIG. 13 is a sequence diagram that illustrates a registration that is performed when an application is installed in the MFP 1 according to the present embodiment.

First, the application to be installed requests the arbitration module 412 to register a service of the application (Step S1201). At that point, the process name (process ID) as well as the UUID that indicates the service are delivered. Thus, the service and the characteristic may be related to the process.

Afterward, the arbitration module 412 notifies the application as to whether a registration is allowed on the basis of whether the UUID of the service is overlapped (Step S1202). FIG. 13 illustrates a case where it is determined that a registration is allowed.

Then, the application requests the arbitration module 412 to register the characteristic included in the service (Step S1203). At that point, the XML-format data that indicates the characteristic as well as the UUID that indicates the characteristic are delivered. Thus, the characteristic that is included in the service used by the application is added to the GATT profile. Furthermore, an explanation is given later of the steps of the process to determine whether a registration is allowed.

Afterward, the arbitration module 412 notifies the application as to whether a registration is allowed on the basis of whether the UUID of the characteristic is overlapped (Step S1204).

During the above-described steps of the process, the data on the application is registered in the arbitration module 412.

Figure 14:
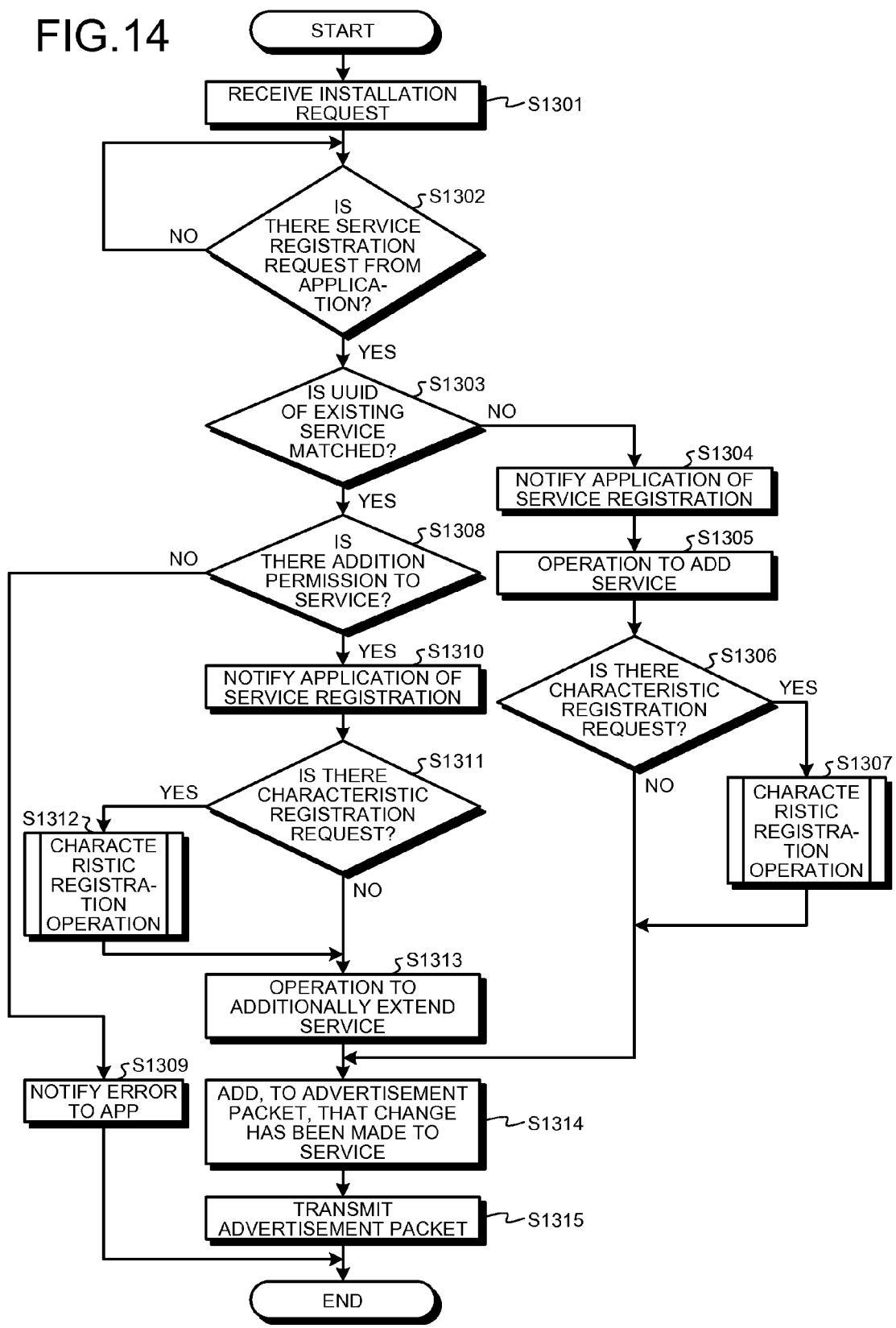
FIG. 14 is a diagram that illustrates the operation that is performed when an application is added to the operating unit according to the embodiment.

Next, an explanation is given of an operation that is performed when an application is added to the operating unit 20. FIG. 14 is a diagram that illustrates the above-described operation by the operating unit 20 according to the present embodiment.

First, the installer 401 receives a request to install the application for the app layer 201 (Step S1301).

Next, the arbitration module 412 determines whether a service registration request is received from the application to be installed (Step S1302). If it is not received (Step S1302: No), the operation at Step S1302 is performed again.

Conversely, if the arbitration module 412 determines that the request to register a service is received from the application to be installed (Step S1302: Yes), the UUID-overlapping check function 421 determines whether the UUID of the service for which the registration request is received matches the UUID of the existing service (Step S1303).

If the UUID-overlapping check function 421 determines that they match (Step S1303: No), the notification function 427 notifies the application to be installed of the service registration (Step S1304). Then, the GATT-service control unit 422 performs an operation to add a new service to the GATT profile via the storage function 426 on the basis of the new-service XML file that is received from the application (Step S1305).

Next, the arbitration module 412 determines whether the application to be installed makes a characteristic registration request (Step S1306). If it is determined that the characteristic registration request is received (Step S1306: Yes), a characteristic registration operation is performed (Step S1307). If it is determined that the characteristic registration request is not received (Step S1306: No), or after the operation is performed at Step S1307, the operation proceeds to Step S1314.

Conversely, at Step S1303, if the UUID-overlapping check function 421 determines that the UUID of the service for which the registration request is received matches the UUID of the existing service (Step S1303: Yes), the UUID-overlapping check function 421 determines whether addition permission is set to the existing service (Step S1308). If the addition permission is not set (Step S1308: No), an error is notified to the application to be installed (Step S1309).

Conversely, the UUID-overlapping check function 421 determines that the addition permission is set to the existing service (Step S1308: Yes), the notification function 427 notifies the application to be installed of the service registration (Step S1310).

Afterward, the arbitration module 412 determines whether the application to be installed makes a characteristic registration request (Step S1311). If it is determined that the characteristic registration request is received (Step S1311: Yes), the characteristic registration operation is performed (Step S1312). If it is determined that the characteristic registration request is not received (Step S1311: No), or after the operation is performed at Step S1312, the GATT-service control unit 422 performs an operation to additionally extend a service of the GATT profile via the storage function 426 with regard to the existing service on the basis of the new-service XML file that is received from the application (Step S1313).

Afterward, the GATT-data transmission/reception function 428 adds, to an advertisement packet, that a change that has been made to the service (Step S1314).

Then, the Bluetooth stack 431 transmits the advertisement packet to a device on the central side via the communication I/F 25 (Step S1315). Here, there is no limitation on the transmission destination of an advertisement packet and, for example, it may be broadcasted.

Figure 15:
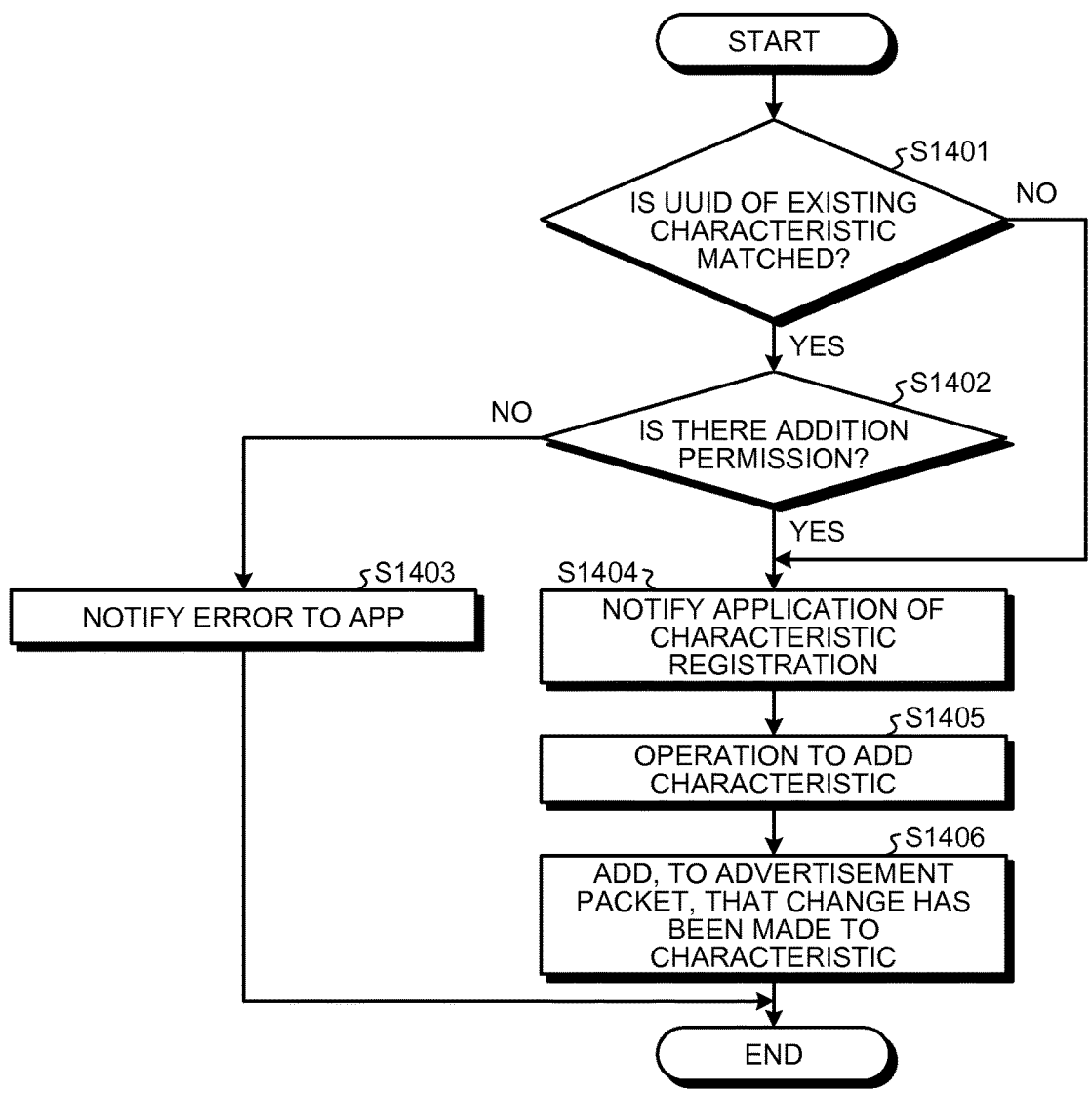
FIG. 15 is a diagram that illustrates an operation to register a characteristic.

Next, an explanation is given of the operation to register a characteristic at Steps S1307 and S1312. FIG. 15 is a diagram that illustrates an operation to register a characteristic. Here, FIG. 15 illustrates an example of the operation that is performed when a request to register a characteristic is made, as illustrated in FIG. 14.

First, the UUID-overlapping check function 421 determines whether the UUID of the characteristic for which the registration request is received matches the UUID of the characteristic of the existing service (Step S1401). If it is determined that they do not match (Step S1401: No), the operation proceeds to Step S1404.

Conversely, if the UUID-overlapping check function 421 determines that they match (Step S1401: Yes), the UUID-overlapping check function 421 determines whether addition permission is set to the characteristic of the existing service (Step S1402). If the addition permission is not set (Step S1402: No), an error is notified to the application to be installed (Step S1403).

Conversely, if the UUID-overlapping check function 421 determines that the addition permission is set to the characteristic of the existing service (Step S1402: Yes), the operation proceeds to Step S1404.

Then, the notification function 427 notifies the application to be installed of the characteristic registration (Step S1404).

Then, the GATT-data control unit 423 performs an operation to add the characteristic to the GATT profile via the storage function 426 (Step S1405).

Afterward, the GATT-data transmission/reception function 428 adds, to the advertisement packet, that a change that has been made to the characteristic (Step S1406).

According to the present embodiment, when an application is uninstalled, a service and a characteristic of the application are deleted from the GATT profile.

Next, an explanation is given of a communication that is performed when a service is deleted during uninstallation of the application. According to the present embodiment, the arbitration module 412 is capable of acquiring the uninstallation information on the application from the application managing unit 411. As a method of acquisition, for example, it is possible to receive an event notification during uninstallation, or the like.

Figure 16:
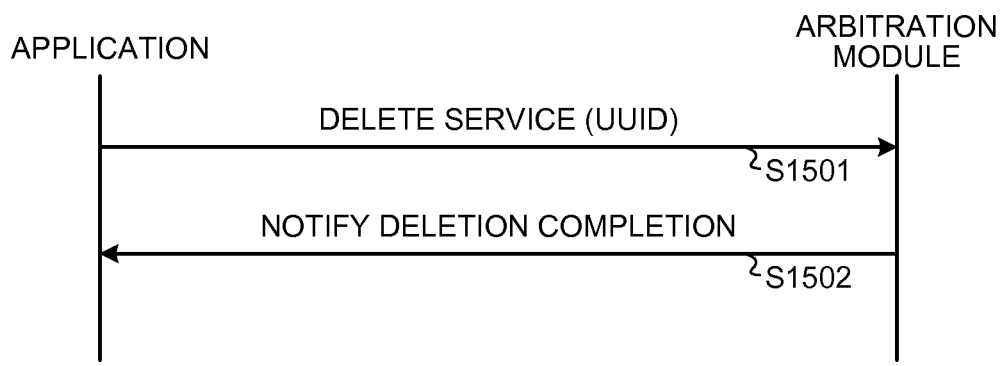
FIG. 16 is a sequence diagram that illustrates a communication that is performed when a service is deleted during uninstallation of the application by the MFP according to the embodiment.

FIG. 16 is a sequence diagram that illustrates a communication that is performed when a service is deleted during uninstallation of the application by the MFP 1 according to the present embodiment.

First, the application to be uninstalled requests the arbitration module 412 to delete a service of the application (Step S1501). At that point, the UUID that indicates the service is delivered. Thus, deletion of the service may be achieved by the arbitration module 412.

Afterward, the arbitration module 412 outputs, to the application, a notification of deletion completion of the service based on the UUID (Step S1502).

Figure 17:
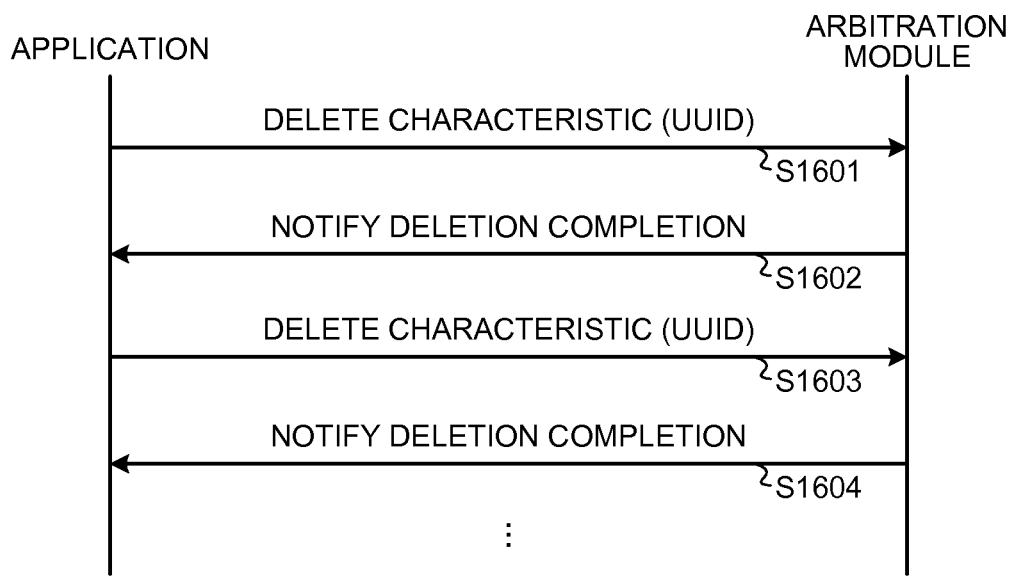
FIG. 17 is a sequence diagram that illustrates a communication that is performed when a characteristic is deleted during uninstallation of the application by the MFP according to the embodiment.

FIG. 17 is a sequence diagram that illustrates a communication that is performed when a characteristic is deleted during uninstallation of the application by the MFP 1 according to the present embodiment.

First, the application to be uninstalled requests the arbitration module 412 to delete the characteristic that is included in the service of the application (Step S1601). At that point, the UUID that indicates the characteristic is delivered. Thus, deletion of the service may be achieved by the arbitration module 412.

Afterward, the arbitration module 412 outputs, to the application, a notification of deletion completion of the characteristic based on the UUID (Step S1602).

Furthermore, this operation is repeated the same number of times as there are the characteristics that are included in the service of the application (e.g., Step S1603 and S1604).

Figure 18:
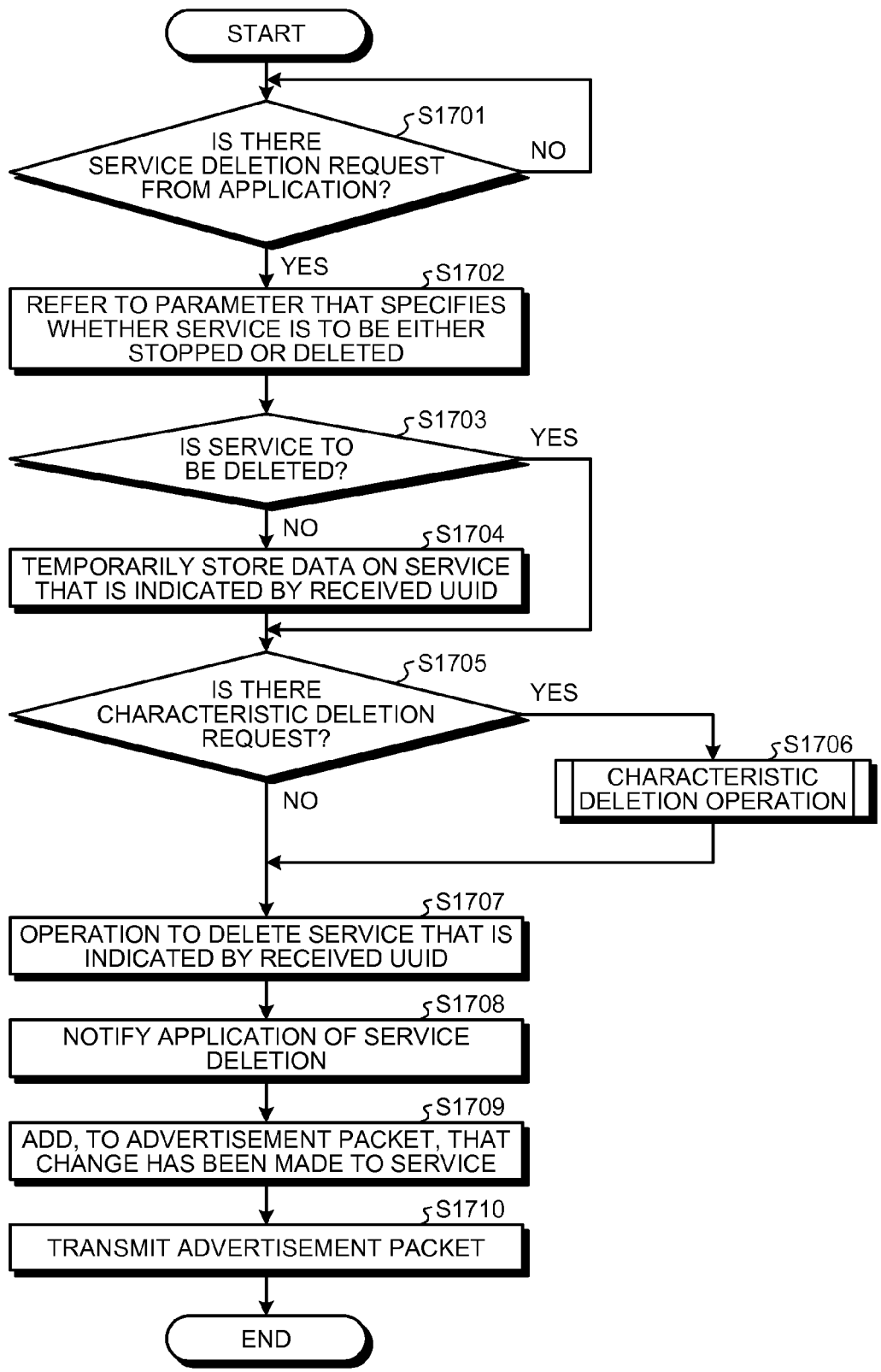
FIG. 18 is a flowchart that illustrates the steps of the operation to delete a service together with uninstallation of a program by the operating unit according to the embodiment.

Next, an explanation is given of an operation to delete a service together with uninstallation of a program by the operating unit 20 according to the present embodiment. FIG. 18 is a flowchart that illustrates the steps of the above-described operation by the operating unit 20 according to the present embodiment.

First, the arbitration module 412 determines whether a service deletion request is received from the application to be uninstalled (Step S1701). If it is not received (Step S1701: No), the operation is performed again at Step S1701.

Conversely, if the arbitration module 412 determines that a service deletion request is received from the application to be uninstalled (Step S1701: Yes), the GATT-service control unit 422 refers to the parameter that specifies whether the service is to be either stopped or deleted (Step S1702).

Furthermore, the GATT-service control unit 422 determines whether the service is to be deleted in accordance with the parameter (Step S1703). If it is determined that the service is to be deleted (Step S1703: Yes), the operation proceeds to Step S1705.

Conversely, if the GATT-service control unit 422 determines that the service is to be stopped, in other words, the service is not to be deleted (Step S1703: No), it temporarily stores the data on the service that is indicated by the UUID that is received together with the service deletion request from the application (Step S1704). The storage destination is the flash memory 24, or the like. As it is stored according to the present embodiment, it may be used when the service is resumed.

Furthermore, the arbitration module 412 determines whether a characteristic deletion request is received from the application to be uninstalled (Step S1705). If it is not received (Step S1705: No), the operation proceeds to Step S1707.

Conversely, if the arbitration module determines that a characteristic deletion request is received from the application to be uninstalled (Step S1705: Yes), a characteristic deletion operation is performed (Step S1706).

Afterward, the GATT-service control unit 422 performs an operation to delete the service that is indicated by the received UUID from the GATT profile (Step S1707).

Next, the notification function 427 notifies the application to be uninstalled of the service deletion (Step S1708).

Afterward, the GATT-data transmission/reception function 428 adds, to an advertisement packet, that a change that has been made to the service (Step S1709). As described above, if a service is deleted, a flag that indicates that a change has been made is set to the advertisement packet. Thus, the central side can determine whether the data needs to be acquired again when the notification is transmitted.

Then, the Bluetooth stack 431 transmits the advertisement packet to a device on the central side via the communication I/F 25 (Step S1710). Here, there is no limitation on the transmission destination of an advertisement packet and, for example, it may be broadcasted.

Figure 19:
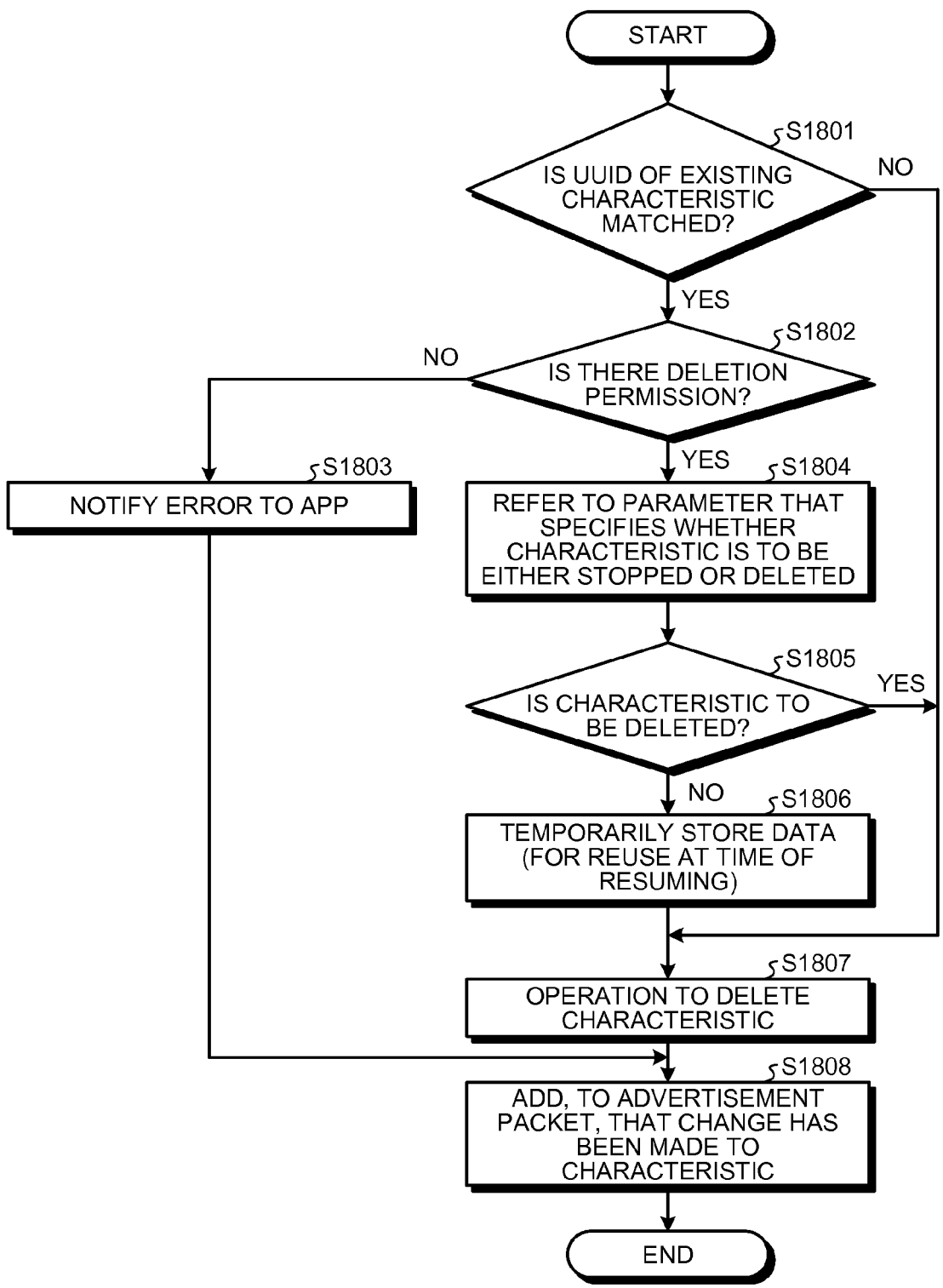
FIG. 19 is a diagram that illustrates an operation to delete a characteristic.

Next, an explanation is given of an operation to delete a characteristic at Step S1706 of FIG. 18. FIG. 19 is a diagram that illustrates an operation to delete a characteristic. Here, FIG. 19 illustrates an example of an operation that is performed when a characteristic deletion request is made, as illustrated in FIG. 18.

First, the UUID-overlapping check function 421 determines whether the UUID of the characteristic for which a deletion request is received matches the UUID of the characteristic of the existing service (Step S1801). If it is determined that they do not match (Step S1801: No), the operation proceeds to Step S1807.

Conversely, if the UUID-overlapping check function 421 determines that they match (Step S1801: Yes), the UUID-overlapping check function 421 determines whether deletion permission is set to the characteristic of the existing service (Step S1802). If the deletion permission is not set (Step S1802: No), an error is notified to the application to be uninstalled (Step S1803).

Conversely, if the UUID-overlapping check function 421 determines that the deletion permission is set to the characteristic of the existing service (Step S1802: Yes), the GATT-data control unit 423 refers to the parameter that specifies whether the characteristic is to be either stopped or deleted (Step S1804).

Furthermore, the GATT-data control unit 423 determines whether the characteristic is to be deleted in accordance with the parameter (Step S1805). If it is determined that the characteristic is to be deleted (Step S1805: Yes), the operation proceeds to Step S1807.

Conversely, if the GATT-data control unit 423 determines that the characteristic is to be stopped, in other words, if the characteristic is not to be deleted (Step S1805: No), it temporarily stores the data on the characteristic that is indicated by the UUID that is received together with the characteristic deletion request from the application (Step S1806). The storage destination is the flash memory 24, or the like. As it is stored according to the present embodiment, it may be used when the characteristic is resumed.

Afterward, the GATT-data control unit 423 performs an operation to delete the characteristic that is indicated by the received UUID from the GATT profile (Step S1807).

Afterward, the GATT-data transmission/reception function 428 adds, to the advertisement packet, a change that has been made to the characteristic (Step S1808). In this way, if a characteristic is deleted, the flag that indicates a change has been made is set to an advertisement packet. Thus, the central side may determine whether data needs to be acquired again when the notification is transmitted.

According to the present embodiment, if the application is re-installed, or the like, after the service and the characteristic used by the uninstalled application are stored in the flash memory 24, the arbitration module 412 adds the data on the service and the characteristic that are stored in the flash memory 24 to the GATT profile.

For example, the arbitration module 412 uses the UUID that is delivered from the application to be re-installed to check whether they are temporarily stored in the flash memory 24. Furthermore, if it is checked that they are temporarily stored, the temporarily stored service and characteristic are added to the GATT profile.

The operating unit 20 according to the present embodiment includes the above-described configuration; thus, it is possible to add or update a service without changing the firmware (OS). Furthermore, services and characteristics are given with unique identification information (UUID), while they are managed without being overlapped. Thus, it is possible to facilitate customization, such as changes in the data structure, and to facilitate functionality extension.

According to the present embodiment, a unique UUID is assigned to each service that is used by an application. This allows the operating unit 20 of the MFP 1 according to the present embodiment to manage the correspondence relationship between the application to be installed and the service that is used by the application. Thus, when an application is installed, the service that corresponds to the function that is used by the application may be easily added.

Furthermore, as the service that is used by an application is managed by using a UUID, functionality extension (additive extension of a part) of the already stored service is facilitated. Thus, for example, by installing a new scanner app, it is possible to add, to the existing service, a new service, such as the information on a new scanner mode that is provided by the application, the counter information on scan, or job logs.

Therefore, without updating the firmware (OS) of the MFP 1, any data may be added to or changed in the GATT profile of Bluetooth (registered trademark). Therefore, as functionality extension for data transmission is facilitated, the function extensibility later on may be improved.

The operating unit 20 according to the present embodiment can arbitrate services. Arbitration is the control that is performed if there is the existing service that has the same UUID as the service to be added. According to the present embodiment, the arbitration module 412 makes a replacement to a new service, maintains the existing service, adds subtraction data, or the like, as the arbitration.

The function of each unit of the above-described MFP 1 is implemented when the CPU (11 or 21) executes a program that is stored in a storage device (e.g., the ROM 12, the HDD 14, the ROM 22, or the flash memory 24); however, this is not a limitation and, for example, at least part of the function of each unit of the above-described MFP 1 may be implemented by a dedicated hardware circuit (e.g., a semiconductor integrated circuit).

Furthermore, according to the above-described embodiment, the main body unit 10 and the operating unit 20 are separately operated by using different operating systems; however, this is not a limitation and, for example, a configuration may be such that the main body unit 10 and the operating unit 20 are operated by using the same operating system.

Furthermore, a configuration may be such that the program to be executed by the MFP 1 according to the above-described embodiment is provided by being stored, in the form of a file that is installable and executable, in a non-transitory computer-readable recording medium, such as a CD-ROM, a flexible disk (FD), a CD-R, a digital versatile disk (DVD), or a universal serial bus (USB), or a configuration may be such that it is provided or distributed via a network, such as the Internet. Moreover, a configuration may be such that various programs are provided by being previously installed in a non-volatile recording medium, such as a ROM.

Furthermore, according to the above-described embodiment, an explanation is given of an example in which the MFP according to the present invention is applied to a multifunction peripheral that has at least two functions out of a copier function, printer function, scanner function, and facsimile function; however, it is applicable to any image forming apparatuses, such as a copier, printer, scanner device, or facsimile machine.

According to the embodiment of the present invention, an advantage is produced such that service additions or changes are facilitated via a wireless communication that conforms to a wireless communication standard for multiple devices by using a profile that defines the method of using a protocol.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data communication device comprising:
a communication interface configured to communicate with an external device using a short-range wireless communication standard;
a storage device configured to store a plurality of profiles, each of the plurality of profiles conforming to the short-range wireless communication standard, the plurality of profiles including a first profile in which multiple services are defined, each of the multiple services including unique identification information;
a memory having computer readable instructions stored thereon; and
at least one processor configured to execute the computer readable instructions to,
when a new application is to be installed in the storage device, the new application including at least one new service,
analyze the new application, the analysis including comparing functionality of the at least one new service with functionality associated with the multiple services of the first profile,
determine whether the services or characteristics of the new application includes the functionality associated with at least one service of the multiple services of the first profile based on results of the analysis,
add or update at least one of the multiple services of the first profile to include the functionality associated with the at least one new service of the new application in accordance with the unique identification information associated with the determined at least one service of the first profile,
receive a service registration request from the new application related to the at least one new service of the new application, the service registration request including a process ID associated with the new application,
transmit new unique identification information assigned to the at least one new service to the new application,
transmit a service registration message to the new application based on the results of the analysis,
receive a characteristic registration request from the new application related to at least one characteristic associated with the at least one new service, the characteristic registration request including Extensible Markup Language (XML) format data related to the at least one characteristic,
add the characteristic to the first profile using the received XML format data related to the at least one characteristic, and
transmit a characteristic registration message to the new application based on results of the registration of the at least one characteristic.

2. The data communication device according to claim 1, wherein the at least one processor is further configured to:
add a first service used by the new application to the first profile when the first profile does not include a different service to which unique identification information identical to unique identification information associated with the first service.

3. The data communication device according to claim 1, wherein the at least one processor is further configured to: update at least one of the multiple services of the first profile to use a first service used by the new application when the first profile includes the at least one of the multiple services that has a unique identification information identical to the unique identification information associated with the first service.

4. The data communication device according to claim 1, wherein the at least one processor is further configured to:
detect an activation state of an installed program; and
control a service that is included in the first profile that corresponds to the installed program in accordance with the detected activation state of the installed program.

5. The data communication device according to claim 1, wherein the at least one processor is further configured to:
transmit a notification to a program that uses attribute information that is defined in the first profile when a request is made to write the attribute information.

6. The data communication device according to claim 1, wherein the at least one processor is configured to:
when the at least one new service of the new application is added or updated, transmit notification of a change in the at least one new service to an external device via the communication interface.

7. The data communication device according to claim 1, wherein, the at least one processor is further configured to:
when the new application is to be uninstalled, delete the at least one new service of the new application from the first profile.

8. The data communication device according to claim 7, wherein, the at least one processor is further configured to:
when the new application is to be uninstalled, store data on the at least one new service of the new application in the storage device.

9. The data communication device according to claim 1, wherein the data communication device is installed in a multi-function printer (MFP).

10. The data communication device according to claim 1, wherein
the short-range wireless communication standard is a Bluetooth related standard; and
the first profile is a Generic Attribute (GATT) profile.

11. The data communication device according to claim 1, wherein the first profile is stored in XML format.

12. A data communication method comprising:
store, using at least one processor, a plurality of profiles, each of the plurality of profiles conforming to a short-range wireless communication standard, the plurality of profiles including a first profile in which multiple services are defined, each of the multiple services including unique identification information in a storage device;
communicate, using the at least one processor, with an external device using the short-range wireless communication standard via a communication interface;
when a new application is to be installed in the storage device, the new application including at least one new service,
analyzing, using the at least one processor, the new application, the analyzing including comparing functionality of the at least one new service with functionality associated with the multiple services of the first profile,
determining, using the at least one processor, whether the services or characteristics of the new application includes the functionality associated with at least one service of the multiple services of the first profile based on results of the analyzing, adding or updating at least one of the multiple services of the first profile to include the functionality associated with the at least one new service of the new application in accordance with the unique identification information associated with the determined at least one service of the first profile, receiving, using the at least one processor, a service registration request from the new application related to the at least one new service of the new application, the service registration request including a process ID associated with the new application, transmitting, using the at least one processor, new unique identification information assigned to the at least one new service to the new application, transmitting, using the at least one processor, a service registration message to the new application based on the results of the analyzing, receiving, using the at least one processor, a characteristic registration request from the new application related to at least one characteristic associated with the at least one new service, the characteristic registration request including Extensible Markup Language (XML) format data related to the at least one characteristic, adding, using the at least one processor, the characteristic to the first profile using the received XML forget related to the at least one characteristic, and transmitting, using the at least one processor, a characteristic registration message to the new application based on results of the registration of the at least one characteristic.

13. The data communication method according to claim 12, wherein the short-range wireless communication standard is a Bluetooth related standard; and the first profile is a Generic Attribute (GATT) profile.

14. The data communication method according to claim 12, wherein the first profile is stored in XML format.

15. A non-transitory computer-readable medium that includes computer readable instructions, which when executed by at least one processor, causes the at least one processor to:

communicate with an external device using a short-range wireless communication standard via a communication interface;

store, in a storage device, a plurality of profiles, each of the plurality of profiles conforming to the short-range wireless communication standard, the plurality of profiles including a first profile in which multiple services are defined, each of the multiple services including unique identification information;

when a new application is to be installed in the storage device, the new application including at least one new service, analyze the new application, the analysis including comparing functionality of the at least one new service with functionality associated with the multiple services of the first profile, determine whether the services or characteristics of the new application includes the functionality associated with at least one service of the multiple services of the first profile based on results of the analysis, add or update at least one of the multiple services of the first profile to include the functionality associated with the at least one new service of the new application in accordance with the unique identification information associated with the determined at least one service of the first profile, receive a service registration request from the new application related to the at least one new service of the new application, the service registration request including a process ID associated with the new application, transmit new unique identification information assigned to the at least one new service to the new application, transmit a service registration message to the new application based on the results of the analyzing, receive a characteristic registration request from the new application related to at least one characteristic associated with the at least one new service, the characteristic registration request including Extensible Markup Language (XML) format data related to the at least one characteristic, add the characteristic to the first profile using the received XML format data related to the at least one characteristic, and transmit a characteristic registration message to the new application based on results of the registration of the at least one characteristic.

16. The non-transitory computer-readable medium according to claim 15, wherein the at least one processor is installed in a multi-function printer (MFP).

17. The non-transitory computer-readable medium according to claim 15, wherein the short-range wireless communication standard is a Bluetooth related standard; and the first profile is a Generic Attribute (GATT) profile.

* * * * *